UNITED STATES PATENT OFFICE.

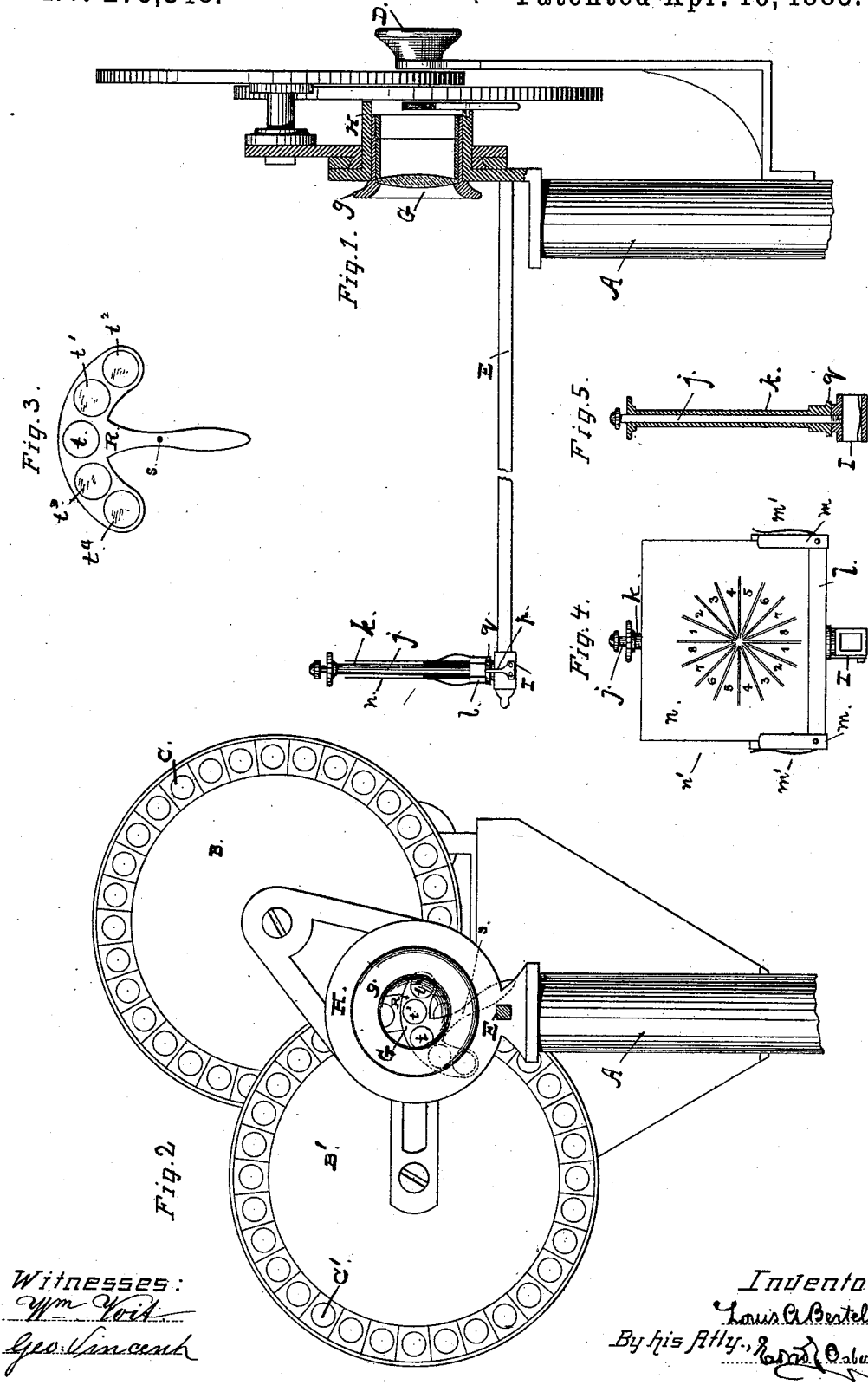

LOUIS A. BERTELING, OF SAN FRANCISCO, CALIFORNIA.

OPTOMETER.

SPECIFICATION forming part of Letters Patent No. 275,348, dated April 10, 1883.

Application filed July 17, 1882. (No model.)

*To all whom it may concern:*

Be it known that I, LOUIS A. BERTELING, a citizen of the United States, residing in the city and county of San Francisco, and State of California, have made and invented certain new and useful Improvements in Optometers; and I do hereby declare that the following is a full, clear, and exact description of the same, reference being had to the accompanying drawings.

My invention relates to improvements in optometers, and more particularly to devices or attachments for combination and use in instruments of the kind that are adapted to test and measure cases of organic defect of the eye known as "astigmatism." In such instruments considerable difficulty is experienced by the optician in ascertaining with accuracy the character and degree of astigmatism in an eye under examination, from the fact that the target or object piece is required to be used in such close relation to the test-lenses that the astigmatism cannot readily be determined, for this abnormal condition is only well defined and its character properly ascertained when the target or testing lines are placed at long distance from the eye.

My improvements, as hereinafter more particularly described, consist, first, in increasing the reading distance with any of the test-lenses in such instrument by applying between the test-lens and the target a magnifying-objective, which, in conjunction with the testing-lens, brings the target into distinct vision at required long distance.

Secondly, in mounting several targets or tests for astigmatism in or upon a rotary frame in such manner that targets of different degrees or grades of complexity can be brought in succession, and one replaced immediately by another of different character in position before the eye under examination. This improvement is of value in ascertaining the correct angle or inclination of the astigmatism.

Thirdly, it consists in providing a series of auxiliary lenses within a swinging frame capable of being brought into line with the testing-lenses of the instrument to vary the power thereof as required. By means of this improvement the capacity of the instrument is increased.

In the accompanying drawings these several improvements are shown as applied to and combined with an improved optometer and astigmatism apparatus which I have made the subject of a prior application for Letters Patent of the United States.

Figure 1 is a vertical sectional view taken longitudinally through the upper part of the instrument, showing the application of the auxiliary lenses and the revolving target. Fig. 2 is a front view taken from the left-hand side of Fig 1. Figs 3, 4, and 5 show parts in detail.

A represents the post or standard of the instrument.

B B' are the disks or carriers containing the testing-lenses C C'.

D is the sight-tube, behind which the carriers are capable of rotation to make any combination of spherical and cylindrical lenses.

E is the graduated rod on which the target or object is movable to and from the eye-piece D.

Now, in the ordinary manner of using such instrument, and more particularly in testing eyes of near-sighted persons, the target frequently requires to be set at such short distance from the testing-lenses in order to bring the characters into distinct vision that astigmatic defects in the eye are not well defined and cannot be readily determined; but by applying a magnifying-objective, G, before the testing-lens I can place the target back to the extreme point of the rod and still render the characters thereon clearly visible to the eye at the sight-tube. This attachment consists of a magnifying-lens, G, mounted in a suitable holder, *g*, and inserted in an opening or socket, H, provided for the purpose in the frame of the instrument. The construction here given makes this objective G readily detachable from the instrument, so that in its ordinary use as an optometer the objective can be removed from in front of the testing-lenses. The combination of this lens with the testing-lenses that are brought into line of the sight-tube operates to increase the reading distance for the observer, thereby rendering the astigmatism determinable and capable of being accurately measured. This attachment enables the most difficult and complex cases of vision to be quickly diagnosed without the necessity of performing a number of tedious experiments and a multiplicity of tests. The patient as well as the oculist thereby is relieved of the fatigue incident to such examination, and the diagnosis is more accurately and delicately made.

In examinations upon cases of defective vision to ascertain whether there be astigmatism or not, and to obtain the proper cylindrical lens and its axial inclination, it is necessary oftentimes to employ a variety of targets of different grades or degrees of simplicity, by means whereof to bring the eye to appreciate gradually the difference in the characters as they are brought to act in succession upon the sight. For such purpose I provide first a simple set of lines or characters, and then substitute for the first another having a greater number or more complex arrangement of lines, until the eye has become accustomed to the action of the lines and can readily distinguish the difference in their character and position as represented on the several targets. In order to enable this change of target to be readily and conveniently made, I provide a revolving holder, which I construct substantially as shown in Figs. 1, 4, and 5 of the drawings. A box or slide, I, has an upright post, $j$, secured on it, around which is placed a sleeve formed of a tube, $k$, carrying cross-arms $l$. The post, being stationary, forms the shaft for the tube to turn upon, and the cross-arms $l$ are provided with spring-clips $m$ $m$ to receive and hold the cards or targets $n$. A small spring-pawl, $p$, fixed to the side of the box, engages with notches in the hub $q$ on the lower end of the tube $k$, to hold the target in proper line and position at right angle to the line of sight. Any desired number of targets can thus be mounted on and carried by this revolving holder. The construction here given provides for four cards, two of which, $n$ $n$, are placed back to back, and the others, $n'$ $n'$, across the ends of the arms $l$ in the clips $m'$ $m'$.

Instant substitution of one target for another can be made by simply rotating the tube $k$, and the oculist has always at hand and ready for use in the instrument a number of test cards or charts of different character. This obviates the frequent interruption occasioned by the necessity of taking out and inserting the targets in the course of an examination.

In many conditions of use fractions or intermediate powers of lenses are often required in such an instrument; but the same cannot well be provided in the disk or lens carriers without increasing the size of the instrument and adding to its costliness, as it would be impracticable to combine intermediate lenses between one power and another. By means of an auxiliary frame or carrier placed in front of the principal lens-carrier and provided with lenses of fractional parts of a power I am enabled, by combining one of such lenses with any one of the principal lenses C, to charge its power to the required degree and add to or take from any lens one-half degree. This attachment is shown in Figs. 2 and 3 of the drawings. It consists of a segment-frame, R, fixed upon a center, $s$, in the instrument, in front of the line of sight and immediately in front of the principal lens-carrier C. The middle opening, $t$, is left blank, and the others, $t'$ $t^2$ $t^3$ $t^4$, are filled with lenses of both orders, those $t'$ $t^2$ on one side with concave and those $t^3$ $t^4$ on the other side with convex lenses of intermediate degrees—that is, the first lenses, $t'$ $t^3$, may be of two and one-half degrees in power, the second ones, $t^2$ $t^4$, of three and one-half degrees. These being combined with the proper one of the principal lenses enables me to produce by such combination a lens of any intermediate power. For example, by combining together the lens $t'$ of the two and one-half degrees with a No. 6 lens I obtain a lens equal to a No. $8\frac{1}{2}$; by substituting a No. 7 for the No. 6 lens I obtain a No. $9\frac{1}{2}$, and so on. Thus it will be seen by means of these auxiliary lenses I obtain an increase in the capacity of the instrument in a very simple manner. The plain opening $t$ allows the carrier to be set so as not to interfere with the ordinary use of the principal lenses. The carrier R may have a single lens of each order, or two or more, as may be desired.

Having thus fully described my invention, what I claim, and desire to secure by Letters Patent, is—

1. In an optometer, the combination, with the testing-lenses, of a magnifying-objective, G, applied to operate substantially as and for the purpose herein set forth.

2. The combination together of the lens-carriers B B', having lenses of both orders, and arranged for joint operation in front of a sight-tube, as described, a magnifying-objective, and a testing chart or target, substantially as hereinbefore described.

3. The revolving target-holder for optometers, consisting of the box or slide I, the post or spindle, and the frame adapted to rotate on said spindle to hold a number of charts, as hereinbefore described.

4. In an optometer, the combination, with the principal testing-lenses, of an auxiliary lens or lenses of intermediate or fractional degrees of power, mounted in a movable segmental frame, R, whereby any one of the lenses may be brought into line or all thrown out of line of the sight through the instrument, substantially as set forth.

Witness my hand and seal.

L. A. BERTELING. [L. S.]

Witnesses:
 EDWARD OSBORN,
 GEO. VINCENT.